United States Patent
Liu et al.

(10) Patent No.: US 10,268,267 B2
(45) Date of Patent: Apr. 23, 2019

(54) CONTENT SHARING METHODS AND APPARATUSES

(71) Applicant: Beijing Zhigu Rui Tuo Tech Co., Ltd, Beijing (CN)

(72) Inventors: Jia Liu, Beijing (CN); Wei Shi, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/326,435

(22) PCT Filed: Jun. 5, 2015

(86) PCT No.: PCT/CN2015/080850
§ 371 (c)(1),
(2) Date: Jan. 13, 2017

(87) PCT Pub. No.: WO2016/008341
PCT Pub. Date: Jan. 21, 2016

(65) Prior Publication Data
US 2017/0199567 A1    Jul. 13, 2017

(30) Foreign Application Priority Data
Jul. 18, 2014    (CN) .......................... 2014 1 0344896

(51) Int. Cl.
*G06F 3/01* (2006.01)
*G06F 3/14* (2006.01)
*G06T 7/70* (2017.01)

(52) U.S. Cl.
CPC ............ *G06F 3/013* (2013.01); *G06F 3/1454* (2013.01); *G06T 7/70* (2017.01)

(58) Field of Classification Search
CPC .......... G06F 3/013; G06F 3/1454; G06T 7/70
(Continued)

(56) References Cited

U.S. PATENT DOCUMENTS 4,513,317 A * 4/1985 Ruoff, Jr. ................. H04N 7/12
                                                      348/E7.045
5,422,653 A * 6/1995 Maguire, Jr. ...... G02B 27/2228
                                                              345/9
(Continued)

FOREIGN PATENT DOCUMENTS

CN    103558909 A    2/2014
CN    103927005 A    7/2014
(Continued)

OTHER PUBLICATIONS

International Search Report for PCT Application No. PCT/CN2015/080850, dated Aug. 26, 2015, 3 pages.

*Primary Examiner* — Tony O Davis
(74) *Attorney, Agent, or Firm* — Amin, Turocy & Watson, LLP

(57) ABSTRACT

Content sharing methods and apparatuses are provided that relate to the field of communications. A method comprises: determining a projection region of a target region on a display region of a first display device relative to at least one eye of a user; and sending related information of the projection region to a second display device. The methods and apparatuses can simplify content sharing steps, improve content sharing efficiency and/or enhance user experience.

33 Claims, 12 Drawing Sheets

(58) Field of Classification Search
USPC .......................................... 345/149, 156, 633
See application file for complete search history.

(56) References Cited

U.S. PATENT DOCUMENTS

| | | | | |
|---|---|---|---|---|
| 6,959,450 | B1* | 10/2005 | Ritter | H04N 7/17318 348/103 |
| 7,284,201 | B2* | 10/2007 | Cohen-Solal | H04L 29/06027 715/738 |
| 7,850,306 | B2* | 12/2010 | Uusitalo | G02B 27/017 351/202 |
| 7,876,978 | B2* | 1/2011 | Berger | G06K 9/2081 348/25 |
| 8,490,002 | B2* | 7/2013 | Fai | G06F 1/1639 345/173 |
| 9,503,786 | B2* | 11/2016 | el Kaliouby | A61B 5/165 |
| 9,530,450 | B2* | 12/2016 | Laksono | G11B 20/10527 |
| 9,646,046 | B2* | 5/2017 | Sadowsky | G06F 17/30386 |
| 9,647,780 | B2* | 5/2017 | Jung | G06F 3/011 |
| 9,829,970 | B2* | 11/2017 | Ellis | G06F 3/013 |
| 2009/0290753 | A1* | 11/2009 | Liu | G06K 9/00718 382/100 |
| 2011/0102449 | A1 | 5/2011 | Toda | |
| 2011/0210963 | A1* | 9/2011 | Lee | G02B 27/0093 345/419 |
| 2011/0260967 | A1* | 10/2011 | Matsushima | G02B 7/002 345/156 |
| 2012/0050493 | A1* | 3/2012 | Ernst | G02B 27/017 348/47 |
| 2012/0057129 | A1* | 3/2012 | Durnell | G03B 13/02 351/210 |
| 2012/0081611 | A1* | 4/2012 | Tan | G09B 5/02 348/584 |
| 2013/0023342 | A1 | 1/2013 | Jung et al. | |
| 2013/0241977 | A1* | 9/2013 | Okamoto | G02B 27/26 345/691 |
| 2013/0242066 | A1* | 9/2013 | Endo | G02B 27/2207 348/53 |
| 2013/0250086 | A1 | 9/2013 | Mar et al. | |
| 2014/0016699 | A1 | 1/2014 | Chen et al. | |
| 2014/0310256 | A1* | 10/2014 | Olsson | G06F 3/013 707/706 |
| 2015/0243078 | A1* | 8/2015 | Watson | G02B 27/017 345/547 |
| 2015/0341400 | A1* | 11/2015 | Vong | H04L 65/403 715/753 |
| 2015/0341441 | A1* | 11/2015 | Saitoh | H04L 67/38 709/208 |
| 2015/0378662 | A1* | 12/2015 | Wan | G06F 3/1423 345/156 |
| 2016/0078680 | A1* | 3/2016 | Reif | G06T 7/0044 345/633 |
| 2016/0093108 | A1* | 3/2016 | Mao | A63F 13/42 345/633 |
| 2016/0143066 | A1* | 5/2016 | Bengtsson | H04W 76/02 370/338 |
| 2016/0148049 | A1* | 5/2016 | Yu | H04N 5/232 348/78 |
| 2016/0260258 | A1* | 9/2016 | Lo | G06T 7/00 |
| 2016/0286338 | A1* | 9/2016 | Bengtsson | G06F 3/0416 |
| 2016/0321841 | A1* | 11/2016 | Christen | G06T 19/006 |
| 2017/0054973 | A1* | 2/2017 | Kasazumi | B60K 35/00 |
| 2017/0199567 | A1* | 7/2017 | Liu | G06F 3/013 |
| 2017/0206048 | A1* | 7/2017 | Liu | H04N 21/4122 |
| 2017/0206050 | A1* | 7/2017 | Liu | G06T 15/00 |
| 2017/0206051 | A1* | 7/2017 | Liu | G06F 3/013 |

FOREIGN PATENT DOCUMENTS

| | | | |
|---|---|---|---|
| CN | 104093061 A | 10/2014 | |
| CN | 104102349 A | 10/2014 | |
| CN | 104123003 A | 10/2014 | |
| WO | 2015149554 A1 | 10/2015 | |
| WO | WO 2015149554 A1 * | 10/2015 | ............ G06F 3/013 |
| WO | 2016008341 A1 | 1/2016 | |
| WO | 2016008342 A1 | 1/2016 | |
| WO | 2016008343 A1 | 1/2016 | |
| WO | WO 2016008341 A1 * | 1/2016 | ............ G06F 3/013 |
| WO | WO 2016008342 A1 * | 1/2016 | ............ G06F 3/01 |
| WO | WO 2016008343 A1 * | 1/2016 | ........ H04N 21/4122 |

* cited by examiner

US 10,268,267 B2

CONTENT SHARING METHODS AND APPARATUSES

RELATED APPLICATION

The present application is a U.S. National Stage filing under 35 U.S.C. § 371 of international patent cooperation treaty (PCT) application No. PCT/CN2015/080850, filed Jun. 5, 2015, and entitled "CONTENT SHARING METHODS AND APPARATUSES", which claims the benefit of priority to Chinese Patent Application No. 201410344896.5, filed on Jul. 18, 2014, which applications are hereby incorporated into the present application by reference herein in their respective entireties.

TECHNICAL FIELD

The present application relates to the field of communications, and in particular, to content sharing methods and apparatuses.

BACKGROUND

With development of technologies, new display devices such as near-to-eye display devices (for example, smart glasses) and transparent screens constantly emerge, and users have more abundant and more convenient content display ways. However, compared with the traditional mobile devices (for example, smart phones and tablet computers), although the new display devices have advantages of great field of vision, being easy to wear and the like, the new display devices still have some disadvantages in aspects such as screen resolution and display effects (color saturation, brightness and contrast); while the traditional mobile devices have developed for several years, and display effects, pixel density thereof and the like have reached a higher level. Therefore, making full use of respective advantages of the traditional mobile devices and the new devices to perform display interaction and content sharing between the two kinds of devices will provide greater convenience for users.

Generally, sharing local content that a user is interested in display content from a display device A to a display device B comprises the following steps: 1) establishing a communication connection between the device A and the device B; 2) sending, by the device A, the display content to the device B; 3) receiving, by the device B, the display content; and 4) obtaining, by the user, a region of interest through a corresponding operation (for example, zoom or take a screenshot) on the device B. The process has tedious steps, takes more time and has poor user experience.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

An example, non-limiting objective of the present application is to provide a content sharing method and apparatus.

According to one aspect of at least one example embodiment of the present application, a content sharing method is provided, the method comprising:
  determining a projection region of a target region on a display region of a first display device relative to at least one eye of a user; and
  sending related information of the projection region to a second display device.

According to one aspect of at least one example embodiment of the present application, a content sharing apparatus is provided, the apparatus comprising:
  a determination module, configured to determine a projection region of a target region on a display region of a first display device relative to at least one eye of a user; and
  a sending module, configured to send related information of the projection region to a second display device.

The content sharing methods and apparatuses according to the example embodiments of the present application can simplify content sharing steps, improve content sharing efficiency and/or enhance user experience.

DETAILED DESCRIPTION

Example embodiments of the present application are described in detail hereinafter with reference to the accompanying drawings and embodiments. The following embodiments are intended to describe the present application, but not to limit the scope of the present application.

It should be understood by those skilled in the art that, in the embodiments of the present application, the value of the serial number of each step described above does not mean an execution sequence, and the execution sequence of each step should be determined according to the function and internal logic thereof, and should not be any limitation to the embodiments of the present application.

Figure 1:
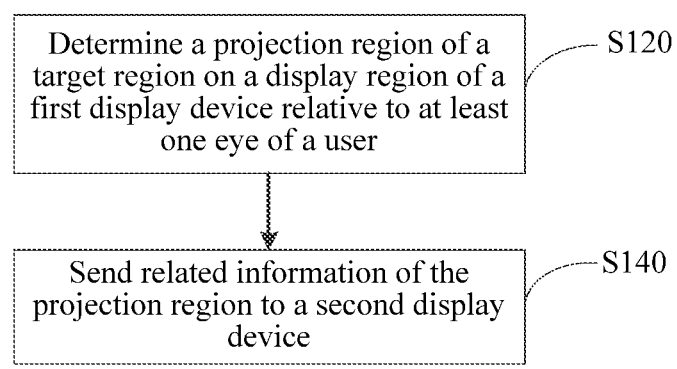
FIG. 1 is a flowchart of the content sharing method according to one example embodiment of the present application.

FIG. 1 is a flowchart of the content sharing method according to one embodiment of the present application. The method may be implemented on, for example, a content sharing apparatus. As shown in FIG. 1, the method comprises:

S120: determining a projection region of a target region on a display region of a first display device relative to at least one eye of a user; and S140: sending related information of the projection region to a second display device.

The content sharing method according to this embodiment of the present application determines a projection region of a target region on a display region of a first display device relative to at least one eye of a user, and then sends related information of the projection region to a second display device, that is to say, a user can receive content of interest on the second display device only by adjusting the position of the target region or the first display device to cause the projection region to cover the content of interest, thereby simplifying content sharing steps, improving content sharing efficiency and enhancing user experience.

The functions of steps S120 and S140 will be described below in detail in combination with example embodiments.

S120: Determine a projection region of a target region on a display region of a first display device relative to at least one eye of a user.

The at least one eye may be one eye (the left eye or the right eye) of the user, or may be two eyes (the left eye and the right eye) of the user. Description will be given below according to two situations of one eye and two eyes respectively. The display region may be a virtual display region.

Firstly, in the situation of one eye, in one example embodiment, step S120 may comprise:

S120': determining a projection region of the target region on the display region of the first display device relative to one eye of the user.

Figure 2:
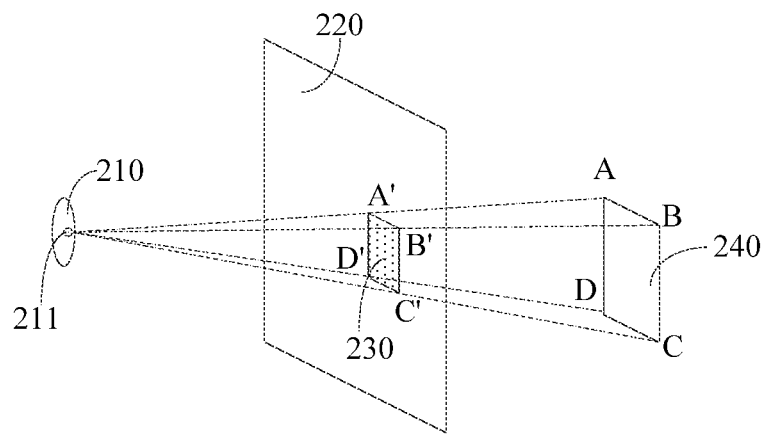
FIG. 2 is a schematic diagram of the projection region in one example embodiment of the present application.

Referring to FIG. 2, the projection region 230 is a region formed by points of intersection between connecting lines from one eye 210 of the user to the target region 240 and the display region 220 of the first display device. As light enters the eye 210 through a pupil 211, it may also be said that the projection region 230 is a region formed by points of intersection between connecting lines from a pupil 211 of one eye 210 of the user to the target region 240 and the display region 220 of the first display device. In addition, the one eye may be the left eye or the right eye, their principles are the same, and will be not described respectively.

By taking FIG. 2 as an example, the projection region 230 may also be understood as a region corresponding to projection formed by convergent light emitted by a light source located on a first side of the target region 240 on the display region 220 of the first display device located on a second side of the target region. The convergent light converges into a point at the pupil 211 of the one eye 210, and the first side is a side opposite to the second side.

Figure 3:
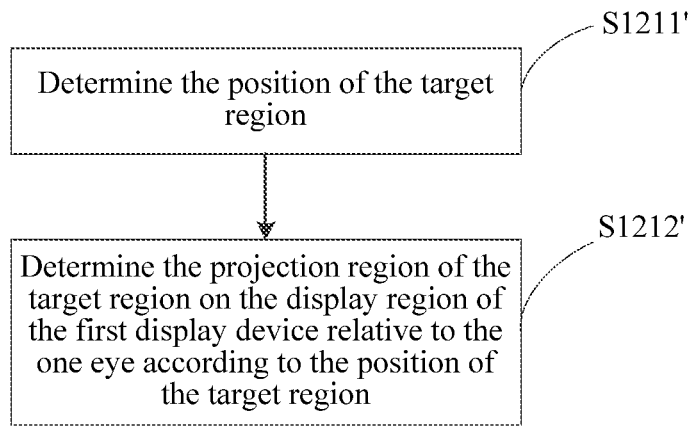
FIG. 3 is a flowchart of step S120' in one example embodiment of the present application.

Referring to FIG. 3, in one example embodiment, step S120' may comprise:

S1211': determining the position of the target region; and

S1212': determining the projection region of the target region on the display region of the first display device relative to the one eye according to the position of the target region.

In step S1211', an image of the target region can be acquired, and then the position of the target region is determined through image processing. In addition, if the target region is associated with an electronic device, the position of the target region may also be determined through communication with the electronic device.

In one example embodiment, the target region is associated with the second display device, for example, the target region is a display region of the second display device, or the target region is a region defined by borders of the second display device. Suppose that, in FIG. 2, the target region 240 is a display region of the second display device and that the target region is rectangular, four vertices A, B, C and D of the target region 240 may send visible light information respectively, and the position of the target region 240 can be determined according to the visible light information.

In another example embodiment, the target region is associated with an object without communication capability, and may be, for example, a region corresponding to a card, or, for example, a region corresponding to a gesture of the user. In this case, an image of the target region can be acquired, and the position of the target region can be obtained according to depth information of the image and the position of the image on the first display region.

In step S1212', the projection region of the target region on the display region of the first display device relative to the one eye can be determined according to the position of the target region and the position of the one eye. The position of the one eye may be pre-stored, or acquired through image processing or other manners after execution of the method begins. By still taking FIG. 2 as an example, suppose that the position of the target region 240 has been determined, a projection point A' of the vertice A on the display region 220 of the first display device (that is, a point of intersection between a connecting line from the vertice A to the eye 210 (or the pupil 211) and the display region 220 of the first display device) can be computed and determined according to the position of the vertice A of the target region 240 and the position of the one eye 210 (or the pupil 211). Similarly, projection points B', C' and D' corresponding to the vertices B, C and D can be obtained, and the projection region 230 can be obtained by connecting the four projection points A', B', C' and D'.

Figure 4:
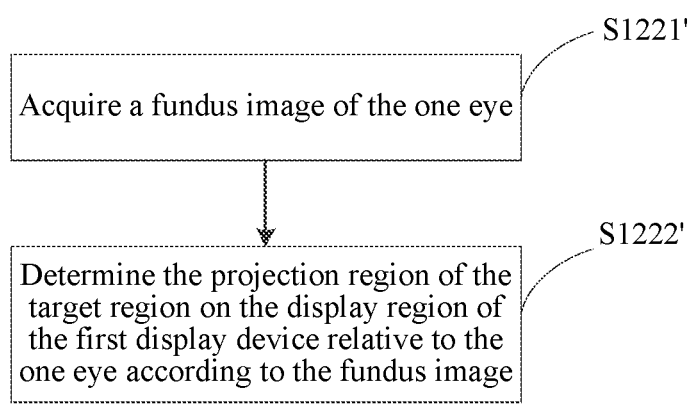
FIG. 4 is a flowchart of step S120' in another example embodiment of the present application.

Referring to FIG. 4, in another example embodiment, step S120' may comprise:

S1221': acquiring a fundus image of the one eye; and

S1222': determining the projection region of the target region on the display region of the first display device relative to the one eye according to the fundus image.

Figure 5:
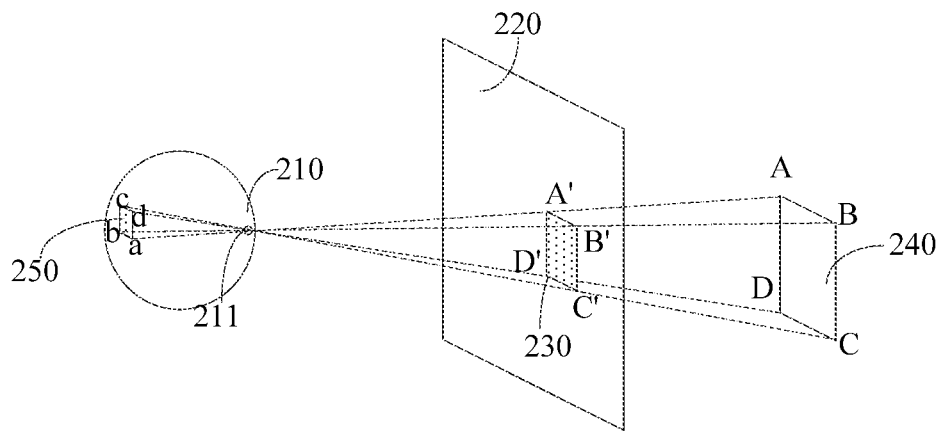
FIG. 5 is a schematic diagram of a relation between the projection region and the fundus image in one example embodiment of the present application.

Referring to FIG. 5, the fundus image 250 is an image formed by the target region 240 at the fundus of the eye 210, it can be seen from FIG. 5 that the fundus image 250 and the target region 240 have a first corresponding relation, and the first corresponding relation satisfies the principle of lens imaging. According to the first corresponding relation, the vertices A, B, C and D of the target region respectively correspond to vertices a, b, c and d of the fundus image 250.

At the same time, it can be seen from FIG. 5 that the fundus image 250 and the projection region 230 have a second corresponding relation, and the second corresponding relation also satisfies the principle of lens imaging. According to the second corresponding relation, the vertices A', B', C' and D' of the projection region 230 respectively correspond to the vertices a, b, c and d of the fundus image 250.

According to the second corresponding relation, a projection point A' of a vertice a of the fundus image 250 on the display region 220 of the first display device can be computed and determined. Similarly, projection points B', C' and D' corresponding to the vertices b, c and d can be obtained, and the projection region 230 can be obtained by connecting the four projection points A', B', C' and D'.

It should be noted that, for the sake of simplicity, the refraction effect of the light when passing through the pupil 211 of the eye 210 is omitted in the view of FIG. 5, but both the first corresponding relation and the second corresponding relation should take the refraction effect into account.

Figure 6:
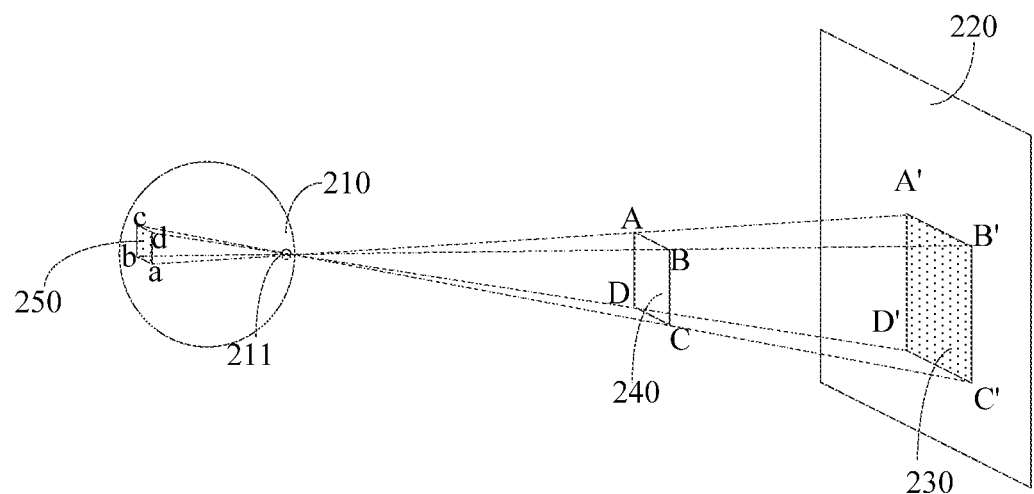
FIG. 6 is a schematic diagram of the relation between the projection region and the fundus image in another example embodiment of the present application.

In addition, in the above example embodiments, the display region 220 of the first display device is located between the eye 210 and the target region 240, but the present application is not limited to the position relation. Referring to FIG. 6, in the event that the target region 240 is located between the eye 210 and the display region 220 of the first display device, the projection region of the target region on the display region of the first display device relative to the one eye may also be determined according to the position of the target region and the position of the one eye, or the projection region of the target region on the display region of the first display device relative to the one eye according to a fundus image of the one eye. The principle is similar to the above example embodiments, which is no longer described individually.

Then, in the situation of two eyes, in one example embodiment, step S120 may comprise:

S120": determining a projection region of the target region on the display region of the first display device relative to two eyes of the user.

Figure 7:
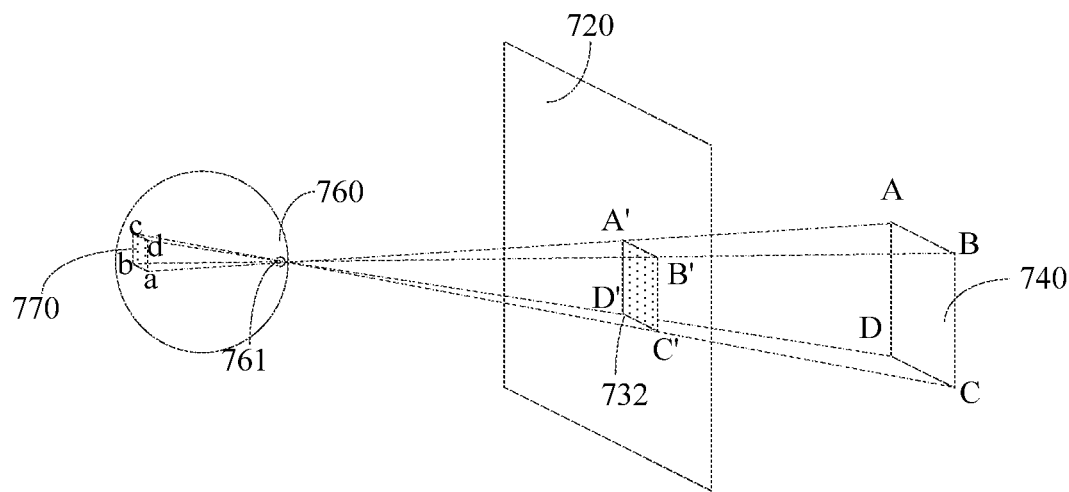
FIG. 7 is a schematic diagram of the projection region in another example embodiment of the present application.

Referring to FIG. 7, in the example embodiment, the projection region is associated with a left eye projection region and a right eye projection region. The left eye projection region is a region formed by points of intersection between connecting lines from the left eye 750 of the user to the target region 740 and the display region 720 of the first display device. The right eye projection region is a region formed by points of intersection between connecting lines from the right eye 760 of the user to the target region 740 and the display region 720 of the first display device. As light enters eyes through pupils, it may also be said that the left eye projection region 731 is a region formed by points of intersection between connecting lines from the left pupil 751 of the left eye 750 of the user to the target region 740 and the display region 720 of the first display device; and the right eye projection region 732 is a region formed by points of intersection between connecting lines from the right pupil 761 of the right eye 760 of the user to the target region 740 and the display region 720 of the first display device.

Figure 8:
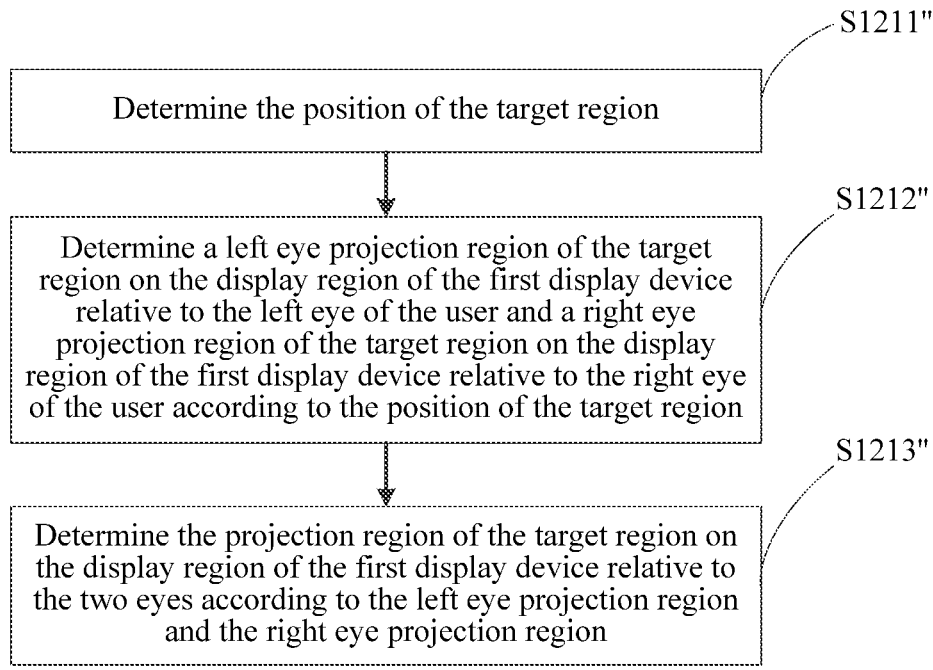
FIG. 8 is a flowchart of step S120" in one example embodiment of the present application.

Referring to FIG. 8, in one example embodiment, step S120" may comprise:

S1211": determining the position of the target region;

S1212": determining a left eye projection region of the target region on the display region of the first display device relative to the left eye of the user and a right eye projection region of the target region on the display region of the first display device relative to the right eye of the user according to the position of the target region; and S1213": determining the projection region of the target region on the display region of the first display device relative to the two eyes according to the left eye projection region and the right eye projection region.

In step S1211", an image of the target region can be acquired, and then the position of the target region is determined through image processing. In addition, if the target region is associated with an electronic device, the position of the target region may also be determined through communication with the electronic device.

In one example embodiment, the target region is associated with the second display device, for example, the target region is a display region of the second display device, or the target region is a region defined by borders of the second display device. Suppose that, in FIG. 7, the target region 740 is a display region of the second display device and that the target region is rectangular, four vertices A, B, C and D of the target region 740 may send visible light information respectively, and the first display device can determine the position of the target region 740 according to the visible light information.

In another example embodiment, the target region is associated with an object without communication capability, and may be, for example, a region corresponding to a card, or, for example, a region corresponding to a gesture of the user. In this case, an image of the target region can be acquired, and the position of the target region can be obtained according to depth information of the image and the position of the image on the first display region.

In step S1212", a right eye projection region 732 of the target region 740 on the display region 720 of the first display device relative to the right eye 760 can be determined according to the position of the target region 740 and the position of the right eye 760. The position of the right eye 760 may be pre-stored, or acquired through image processing or other manners after execution of the method begins. By still taking FIG. 7 as an example, suppose that the position of the target region 740 has been determined, a projection point A' of the vertice A on the display region 720 of the first display device (that is, a point of intersection between a connecting line from a vertice A to the right eye 760 (or the right pupil 761) and the display region 720 of the first display device) can be computed and determined according to the position of the vertice A of the target region 740 and the position of the right eye 760 (or the right pupil 761). Similarly, projection points B', C' and D' corresponding to the vertices B, C and D can be obtained, and the right eye projection region 732 can be obtained by connecting the four projection points A', B', C' and D'. The above steps are repeated on the left eye 750, and the left eye projection region 731 can be obtained.

In step S1213", the projection region finally determined may comprise the left eye projection region 731 and the right eye projection region 732, or the projection region finally determined may only comprise an overlapping region of the left eye projection region 731 and the right eye projection region 732.

Figure 9:
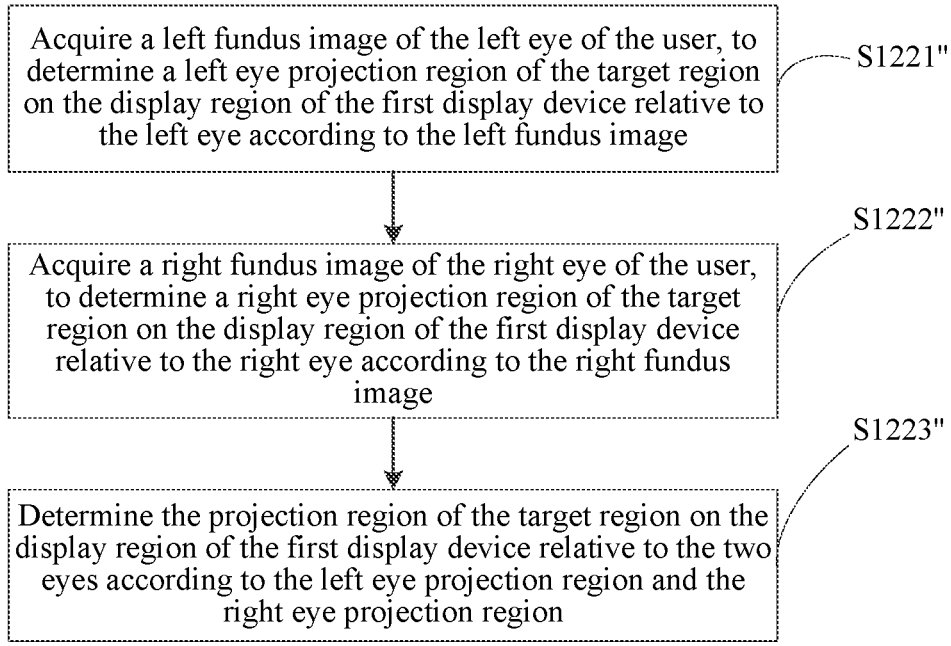
FIG. 9 is a flowchart of step S120" in another example embodiment of the present application.

Referring to FIG. 9, in another example embodiment, step S120" may comprise:

S1221": acquiring a left fundus image of the left eye of the user, to determine a left eye projection region of the target region on the display region of the first display device relative to the left eye according to the left fundus image;

S1222": acquiring a right fundus image of the right eye of the user, to determine a right eye projection region of the target region on the display region of the first display device relative to the right eye according to the right fundus image; and S1223": determining the projection region of the target region on the display region of the first display device relative to the two eyes according to the left eye projection region and the right eye projection region.

Figure 10:
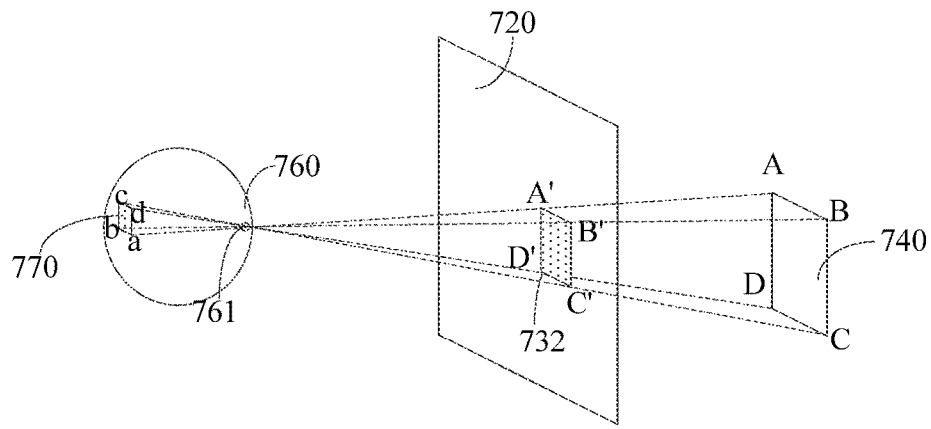
FIG. 10 is a schematic diagram of the relation between the projection region and the fundus image in another example embodiment of the present application.

Referring to FIG. 10, the right fundus image 770 is an image formed by the target region 740 at the fundus of the right eye 760, it can be seen from FIG. 10 that the right fundus image 770 and the target region 740 have a third corresponding relation, and the third corresponding relation satisfies the principle of lens imaging. According to the third corresponding relation, the vertices A, B, C and D of the target region 740 respectively correspond to vertices a, b, c and d of the right fundus image 770.

At the same time, it can be seen from FIG. 10 that the right fundus image 770 and the right eye projection region 732 have a fourth corresponding relation, and the fourth corresponding relation also satisfies the principle of lens imaging. According to the fourth corresponding relation, vertices A', B', C' and D' of the right eye projection region 732 respectively correspond to the vertices a, b, c and d of the right fundus image 770.

According to the fourth corresponding relation, a projection point A' of a vertice a of the right fundus image 770 on the display region 720 of the first display device can be computed and determined. Similarly, projection points B', C' and D' corresponding to the vertices b, c and d can be obtained, and the right eye projection region 732 can be obtained by connecting the four projection points A', B', C' and D'.

Likewise, the left eye projection region 731 can be obtained.

It should be noted that, for the sake of simplicity, the refraction effect of the light when passing through the right pupil 761 of the right eye 760 is omitted in the view of FIG. 10, but both the third corresponding relation and the fourth corresponding relation should take the refraction effect into account.

Similar to the previous example embodiment, the projection region finally determined may comprise the left eye projection region 731 and the right eye projection region 732, or the projection region finally determined may only comprise an overlapping region of the left eye projection region 731 and the right eye projection region 732.

In addition, in the above example embodiments, the display region 720 of the first display device is located between the eyes (the left eye 750 and the right eye 760) and the target region 740, but the present application is not limited to the position relation. In the event that the target region 740 is located between the eyes and the display region 720 of the first display device, the method of the present application may also be implemented according to the same principle, which is no longer described individually herein.

S140: Send related information of the projection region to a second display device.

As stated above, the second display device may be associated with the display region, and in this case, the content sharing apparatus may establish a communication connection with the second display device after execution of the method begins, and sends related information of the projection region to the second display device in this step.

Figure 11:
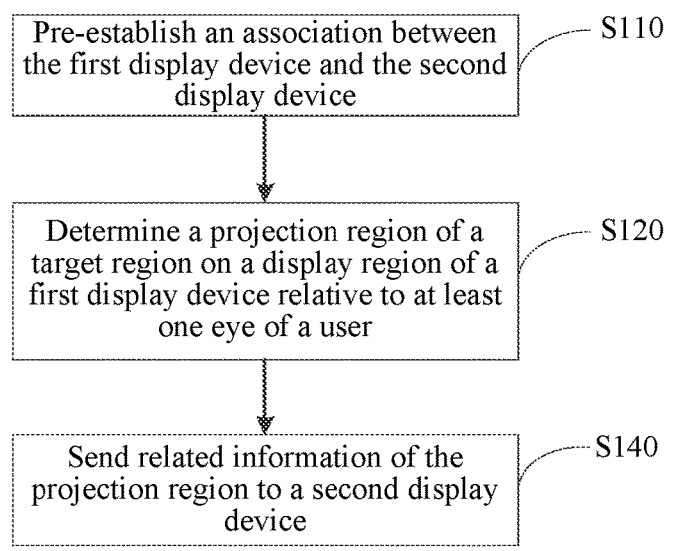
FIG. 11 is a flowchart of the content sharing method in one example embodiment of the present application.

In another example embodiment, referring to FIG. 11, the method may further comprise a step of:

S110: pre-establishing an association between the first display device and the second display device.

In this case, the display region may not be directly associated with the second display device, for example, the display region may be a region encircled by index fingers and thumbs of two hands of the user.

The related information of the projection region may comprise: display content of the projection region. The display content may be an image, a map, a document, an application window or the like.

Alternatively, the related information of the projection region may comprise: display content of the projection region, and associated information of the display content. For example, if the display content of the projection region is a local map of a certain city, the associated information may comprise views of different enlarged scales of the local map. Thus, the user can perform a zooming operation on the local map on the second display device.

Alternatively, the related information of the projection region may comprise: coordinate information of display content of the projection region. For example, if a local map of a certain city is displayed in the projection region, the coordinate information is coordinate information (that is, latitude and longitude information) of two diagonal vertices of the local map, and according to the coordinate information, the second display device can take a screenshot of the local map on a map stored locally and display the local map to the user.

In addition, in order to make the user enjoy a better display effect, resolution of the second display device may be higher than that of the first display device.

Figure 12:
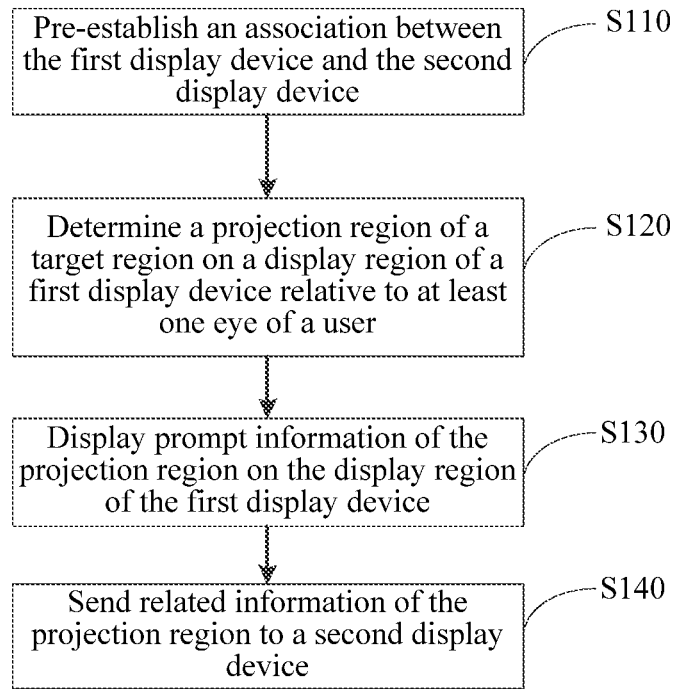
FIG. 12 is a flowchart of the content sharing method in another example embodiment of the present application.

Referring to FIG. 12, in order to make the user conveniently adjust the position of the projection region on the first display region and to ensure content that the user is interested in is covered by the projection region, the method may further comprise:

S130: displaying prompt information of the projection region on the display region of the first display device.

Figure 13:
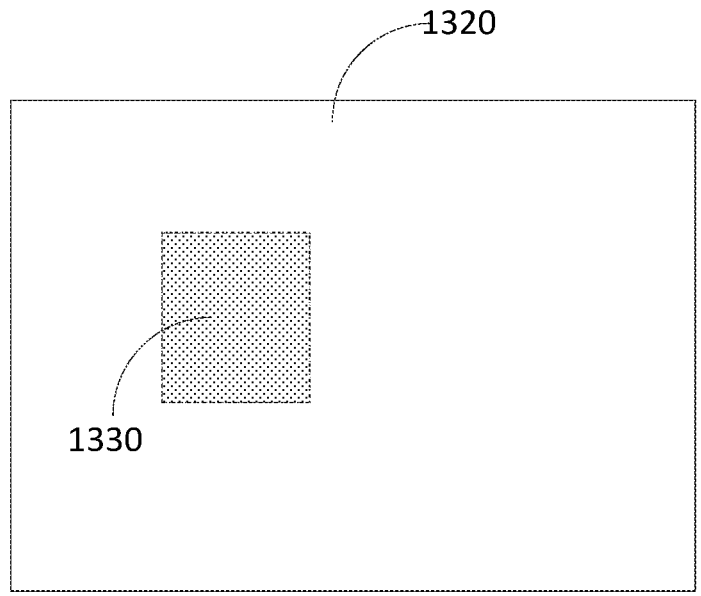
FIG. 13 is a schematic diagram of the prompt information in one example embodiment of the present application.

As shown in FIG. 13, the prompt information may be a dotted box displayed on the display region 1320 of the first display device, and a region encircled by the dotted box is the projection region 1330. In response to that the user adjusts the position of the first display device or the target region, that is, relative positions of the first display device and the target region are adjusted, the dotted box will change its position on the display region 1320 of the first display device, and thus the user can make the projection region 1330 cover the content that the user is interested in more conveniently.

In addition, the embodiment of the present application further provides a computer readable medium, comprising a computer readable instruction that performs the following operations when being executed: executing the operations of step S120 and S140 of the method in the example embodiment shown in FIG. 1.

To sum up, according to the method in the embodiment of the present application, a projection region of a target region on a display region of a first display device relative to at least one eye of a user can be determined, then related information of the projection region is sent to a second display device, and prompt information can be displayed to prompt a user to adjust opposite positions of the first display device and the target region, so as to help the user to make the projection region cover content that the user is interested in, thus simplifying an operation step of sharing a part of display content on the first display device to the second display device, improving content sharing efficiency and enhancing user experience.

Figure 14:
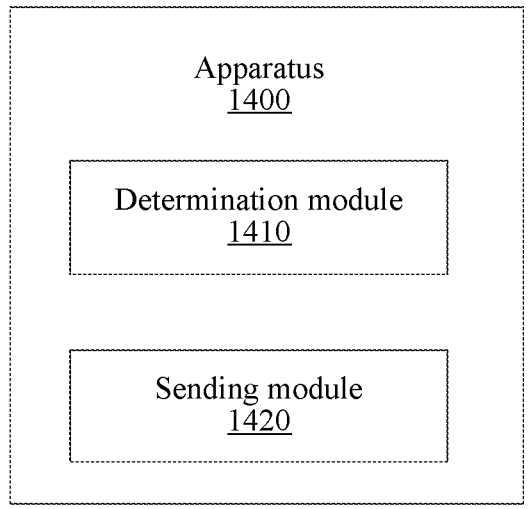
FIG. 14 is a schematic diagram of a modular structure of the content sharing apparatus according to one example embodiment of the present application.

FIG. 14 is a schematic diagram of a modular structure of the content sharing apparatus according to one embodiment of the present application; as shown in FIG. 14, the apparatus 1400 may comprise:
  a determination module 1410, configured to determine a projection region of a target region on a display region of a first display device relative to at least one eye of a user; and
  a sending module 1420, configured to send related information of the projection region to a second display device.

The content sharing apparatus according to the embodiment of the present application determines a projection region of a target region on a display region of a first display device relative to at least one eye of a user, and then sends related information of the projection region to a second display device, that is to say, a user can receive content of interest on the second display device only by adjusting the position of the target region or the first display device to cause the projection region to cover the content of interest, thereby simplifying content sharing steps, improving content sharing efficiency and enhancing user experience.

The content sharing apparatus 1400 may be disposed on the first display device as a functional module.

The functions of the determination module 1410 and the sending module 1420 will be described below in detail in combination with example embodiments.

A determination module 1410, configured to determine a projection region of a target region on a display region of a first display device relative to at least one eye of a user.

The at least one eye may be one eye (the left eye or the right eye) of the user, or may be two eyes (the left eye and the right eye) of the user. Description will be given below according to two situations of one eye and two eyes respectively.

Figure 15:
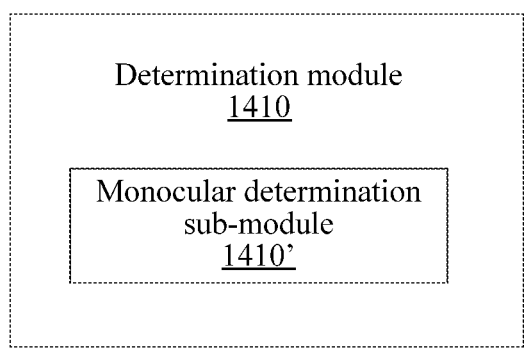
FIG. 15 is a schematic diagram of a modular structure of the determination module in one example embodiment of the present application.

Firstly, in the situation of one eye, referring to FIG. 15, in one example embodiment, the determination module 1410 comprises:
  a monocular determination sub-module 1410', configured to determine a projection region of the target region on the display region of the first display device relative to one eye of the user.

Figure 16:
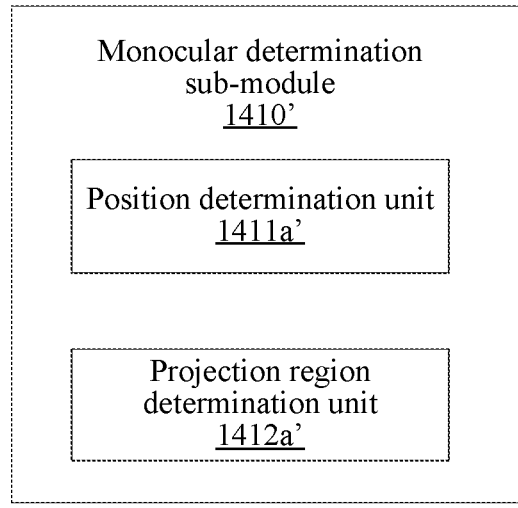
FIG. 16 is a schematic diagram of a modular structure of the monocular determination sub-module in one example embodiment of the present application.

Referring to FIG. 16, in one example embodiment, the monocular determination sub-module 1410' may comprise:

a position determination unit 1411a', configured to determine the position of the target region; and
  a projection region determination unit 1412a', configured to determine the projection region of the target region on the display region of the first display device relative to the one eye according to the position of the target region.

The position determination unit 1411a' can acquire an image of the target region, and then determines the position of the target region through image processing. In addition, if the target region is associated with an electronic device, the position of the target region may also be determined through communication with the electronic device.

In one example embodiment, the target region is associated with the second display device, for example, the target region is a display region of the second display device, or the target region is a region defined by borders of the second display device. Suppose that, in FIG. 2, the target region 240 is a display region of the second display device and that the target region is rectangular, four vertices A, B, C and D of the target region 240 may send visible light information respectively, and the position of the target region 240 can be determined according to the visible light information.

In another example embodiment, the target region is associated with an object without communication capability, and may be, for example, a region corresponding to a card, or, for example, a region corresponding to a gesture of the user. In this case, an image of the target region can be acquired, and the position of the target region can be obtained according to depth information of the image and the position of the image on the first display region.

The projection region determination unit 1412a' can determine the projection region of the target region on the display region of the first display device relative to the one eye according to the position of the target region and the position of the one eye. The position of the one eye may be pre-stored, or acquired through image processing or other manners after execution of the method begins. By still taking FIG. 2 as an example, suppose that the position of the target region 240 has been determined, a projection point A' of the vertice A on the display region 220 of the first display device (that is, a point of intersection between a connecting line from the vertice A to the eye 210 (or the pupil 211) and the display region 220 of the first display device) can be computed and determined according to the position of the vertice A of the target region 240 and the position of the one eye 210 (or the pupil 211). Similarly, projection points B', C' and D' corresponding to the vertices B, C and D can be obtained, and the projection region 230 can be obtained by connecting the four projection points A', B', C' and D'.

Figure 17:
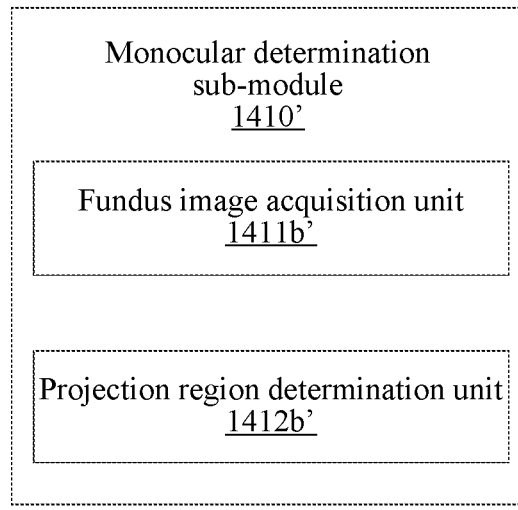
FIG. 17 is a schematic diagram of a modular structure of the monocular determination sub-module in another example embodiment of the present application.

Referring to FIG. 17, in another example embodiment, the monocular determination sub-module 1410' comprises:
  a fundus image acquisition unit 1411b', configured to acquire a fundus image of the one eye; and
  a projection region determination unit 1412b', configured to determine the projection region of the target region on the display region of the first display device relative to the one eye according to the fundus image.

Referring to FIG. 5, the fundus image 250 is an image formed by the target region 240 at the fundus of the eye 210, it can be seen from FIG. 5 that the fundus image 250 and the target region 240 have a first corresponding relation, and the first corresponding relation satisfies the principle of lens imaging. According to the first corresponding relation, the vertices A, B, C and D of the target region respectively correspond to vertices a, b, c and d of the fundus image 250.

At the same time, it can be seen from FIG. 5 that the fundus image 250 and the projection region 230 have a second corresponding relation, and the second corresponding relation also satisfies the principle of lens imaging. According to the second corresponding relation, the vertices A', B', C' and D' of the projection region 230 respectively correspond to the vertices a, b, c and d of the fundus image 250.

According to the second corresponding relation, the projection region determination unit 1412b' can compute and determine a projection point A' of a vertice a of the fundus image 250 on the display region 220 of the first display device. Similarly, projection points B', C' and D' corresponding to the vertices b, c and d can be obtained, and the projection region 230 can be obtained by connecting the four projection points A', B', C' and D'.

It should be noted that, for the sake of simplicity, the refraction effect of the light when passing through the pupil 211 of the eye 210 is omitted in the view of FIG. 5, but both the first corresponding relation and the second corresponding relation should take the refraction effect into account.

Figure 18:
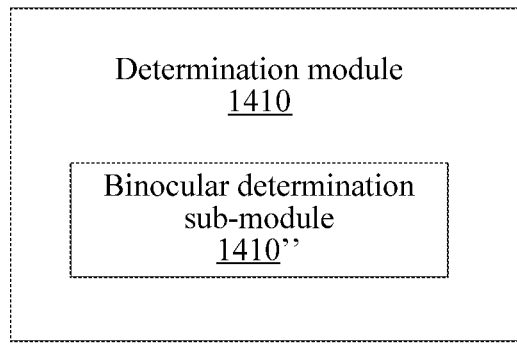
FIG. 18 is a schematic diagram of a modular structure of the determination module in another example embodiment of the present application.

Then, in the situation of two eyes, in one example embodiment, referring to FIG. 18, the determination module 1410 comprises:

a binocular determination sub-module 1410", configured to determine a projection region of the target region on the display region of the first display device relative to two eyes of the user.

Referring to FIG. 7, in the example embodiment, the projection region is associated with a left eye projection region and a right eye projection region. The left eye projection region is a region formed by points of intersection between connecting lines from the left eye 750 of the user to the target region 740 and the display region 720 of the first display device. The right eye projection region is a region formed by points of intersection between connecting lines from the right eye 760 of the user to the target region 740 and the display region 720 of the first display device. As light enters eyes through pupils, it may also be said that the left eye projection region 731 is a region formed by points of intersection between connecting lines from the left pupil 751 of the left eye 750 of the user to the target region 740 and the display region 720 of the first display device; and the right eye projection region 732 is a region formed by points of intersection between connecting lines from the right pupil 761 of the right eye 760 of the user to the target region 740 and the display region 720 of the first display device.

Figure 19:
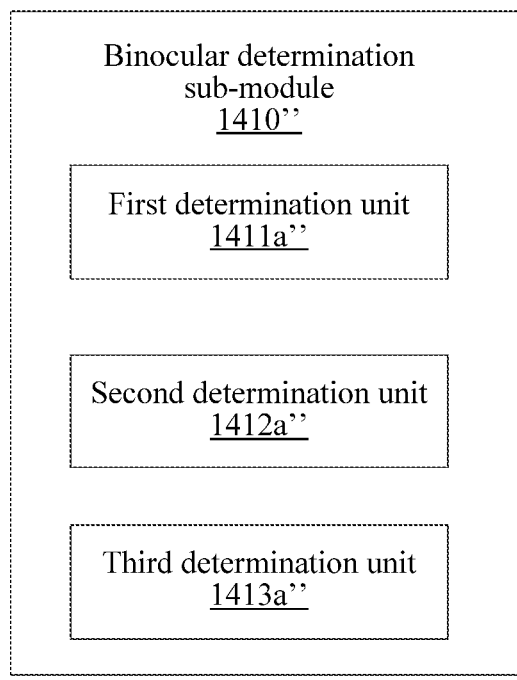
FIG. 19 is a schematic diagram of a modular structure of the binocular determination sub-module in one example embodiment of the present application.

Referring to FIG. 19, in one example embodiment, the binocular determination sub-module 1410" comprises:

a first determination unit 1411a", configured to determine the position of the target region;

a second determination unit 1412a", configured to determine a left eye projection region of the target region on the display region of the first display device relative to the left eye of the user and a right eye projection region of the target region on the display region of the first display device relative to the right eye of the user according to the position of the target region; and a third determination unit 1413a", configured to determine the projection region of the target region on the display region of the first display device relative to the two eyes according to the left eye projection region and the right eye projection region.

The first determination unit 1411a" can acquire an image of the target region, and then determines the position of the target region through image processing. In addition, if the target region is associated with an electronic device, the position of the target region may also be determined through communication with the electronic device.

In one example embodiment, the target region is associated with the second display device, for example, the target region is a display region of the second display device, or the target region is a region defined by borders of the second display device. Suppose that, in FIG. 7, the target region 740 is a display region of the second display device and that the target region is rectangular, four vertices A, B, C and D of the target region 740 may send visible light information respectively, and the first display device can determine the position of the target region 740 according to the visible light information.

In another example embodiment, the target region is associated with an object without communication capability, and may be, for example, a region corresponding to a card, or, for example, a region corresponding to a gesture of the user. In this case, an image of the target region can be acquired, and the position of the target region can be obtained according to depth information of the image and the position of the image on the first display region.

The second determination unit 1412a" can determine a right eye projection region 732 of the target region 740 on the display region 720 of the first display device relative to the right eye 760 according to the position of the target region 740 and the position of the right eye 760. The position of the right eye 760 may be pre-stored, or acquired through image processing or other manners after execution of the method begins. By still taking FIG. 7 as an example, suppose that the position of the target region 740 has been determined, a projection point A' of the vertice A on the display region 720 of the first display device (that is, a point of intersection between a connecting line from a vertice A to the right eye 760 (or the right pupil 761) and the display region 720 of the first display device) can be computed and determined according to the position of the vertice A of the target region 740 and the position of the right eye 760 (or the right pupil 761). Similarly, projection points B', C' and D' corresponding to the vertices B, C and D can be obtained, and the right eye projection region 732 can be obtained by connecting the four projection points A', B', C' and D'. Likewise, the left eye projection region 731 can be obtained.

The projection region finally determined by the third determination unit 1413a" may comprise the left eye projection region 731 and the right eye projection region 732, or the projection region finally determined may only comprise an overlapping region of the left eye projection region 731 and the right eye projection region 732.

Figure 20:
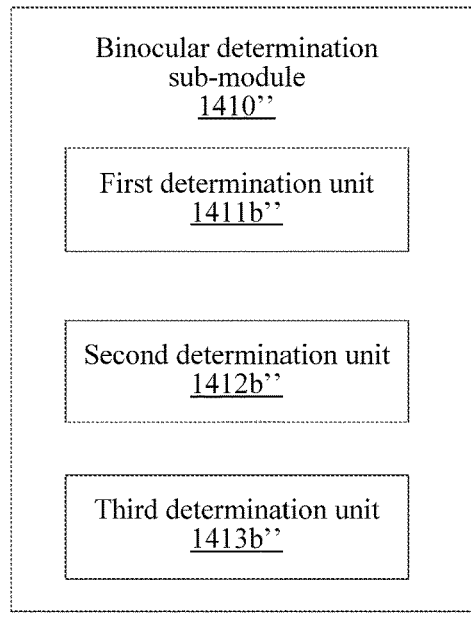
FIG. 20 is a schematic diagram of a modular structure of the binocular determination sub-module in another example embodiment of the present application.

Referring to FIG. 20, in another example embodiment, the binocular determination sub-module 1410" may comprise:

a first determination unit 1411b", configured to acquire a left fundus image of the left eye of the user, to determine a left eye projection region of the target region on the display region of the first display device relative to the left eye according to the left fundus image;

a second determination unit 1412b", configured to acquire a right fundus image of the right eye of the user, to determine a right eye projection region of the target region on the display region of the first display device relative to the right eye according to the right fundus image; and a third determination unit 1413b", configured to determine the projection region of the target region on the display region of the first display device relative to the two eyes according to the left eye projection region and the right eye projection region.

Referring to FIG. 10, the right fundus image 770 is an image formed by the target region 740 at the fundus of the right eye 760, it can be seen from FIG. 10 that the right fundus image 770 and the target region 740 have a third corresponding relation, and the third corresponding relation satisfies the principle of lens imaging. According to the third corresponding relation, the vertices A, B, C and D of the target region 740 respectively correspond to vertices a, b, c and d of the right fundus image 770.

At the same time, it can be seen from FIG. 10 that the right fundus image 770 and the right eye projection region 732 have a fourth corresponding relation, and the fourth corresponding relation also satisfies the principle of lens imaging. According to the fourth corresponding relation, vertices A', B', C' and D' of the right eye projection region 732 respectively correspond to the vertices a, b, c and d of the right fundus image 770.

According to the fourth corresponding relation, a projection point A' of a vertice a of the right fundus image 770 on the display region 720 of the first display device can be computed and determined. Similarly, projection points B', C' and D' corresponding to the vertices b, c and d can be obtained, and the right eye projection region 732 can be obtained by connecting the four projection points A', B', C' and D'.

Likewise, the left eye projection region 731 can be obtained.

It should be noted that, for the sake of simplicity, the refraction effect of the light when passing through the right pupil 761 of the right eye 760 is omitted in the view of FIG. 10, but both the third corresponding relation and the fourth corresponding relation should take the refraction effect into account.

Similar to the previous example embodiment, the projection region finally determined by the third determination unit 1413b" may comprise the left eye projection region 731 and the right eye projection region 732, or the projection region finally determined may only comprise an overlapping region of the left eye projection region 731 and the right eye projection region 732.

A sending module 1420, configured to send related information of the projection region to a second display device.

As stated above, the second display device may be associated with the display region, and in this case, the content sharing apparatus may establish a connection between the first display device and the second display device after finding the display region, and sends related information of the projection region to the second display device in this step.

Figure 21:
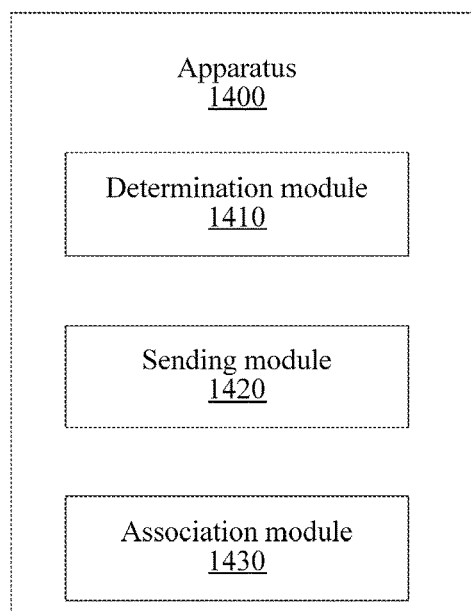
FIG. 21 is a schematic diagram of a modular structure of the content sharing apparatus in one example embodiment of the present application.

Referring to FIG. 21, in another example embodiment, the apparatus 1400 may further comprise:
  an association module 1430, configured to pre-establish an association between the first display device and the second display device.

In this case, the display region may not be directly associated with the second display device, for example, the display region may be a region encircled by index fingers and thumbs of two hands of the user.

The related information of the projection region may comprise: display content of the projection region. The display content may be an image, a map, a document, an application window or the like.

Alternatively, the related information of the projection region may comprise: display content of the projection region, and associated information of the display content. For example, if the display content of the projection region is a local map of a certain city, the associated information may comprise views of different enlarged scales of the local map. Thus, the user can perform a zooming operation on the local map on the second display device.

Alternatively, the related information of the projection region may comprise: coordinate information of display content of the projection region. For example, if a local map of a certain city is displayed in the projection region, the coordinate information is coordinate information (that is, latitude and longitude information) of two diagonal vertices of the local map, and according to the coordinate information, the second display device can take a screenshot of the local map on a map stored locally and display the local map to the user.

In addition, in order to make the user enjoy a better display effect, resolution of the second display device may be higher than that of the first display device.

Figure 22:
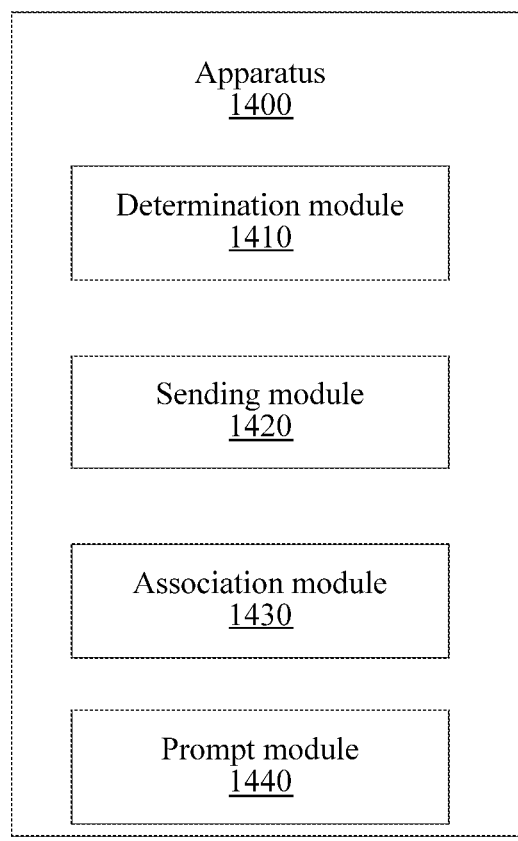
FIG. 22 is a schematic diagram of a modular structure of the content sharing apparatus in another example embodiment of the present application.

Referring to FIG. 22, in order to make the user conveniently adjust the position of the projection region on the first display region and to ensure content that the user is interested in is covered by the projection region, the apparatus 1400 may further comprise:
  a prompt module 1440, configured to display prompt information of the projection region on the display region of the first display device.

One application scenario of the content sharing method and apparatus according to the embodiment of the present application may be as follows: a user wears a pair of smart glasses to browse stored photos, the smart glasses project the photos to eyes of the user, that is, a virtual display region is formed in front of the eyes of the user, when the user sees a group photo, he/she wants to take a screenshot of his/her own head in the group photo and transmit the screenshot to his/her mobile phone, then, the user places the mobile phone in front of the virtual display region, a projection region corresponding to the a display region of the mobile phone is given on the virtual display region, the user adjusts the position of the mobile phone until the projection region covers his/her head and then sends a voice instruction to the smart glasses, and the smart glasses send the head to the mobile phone.

Figure 23:
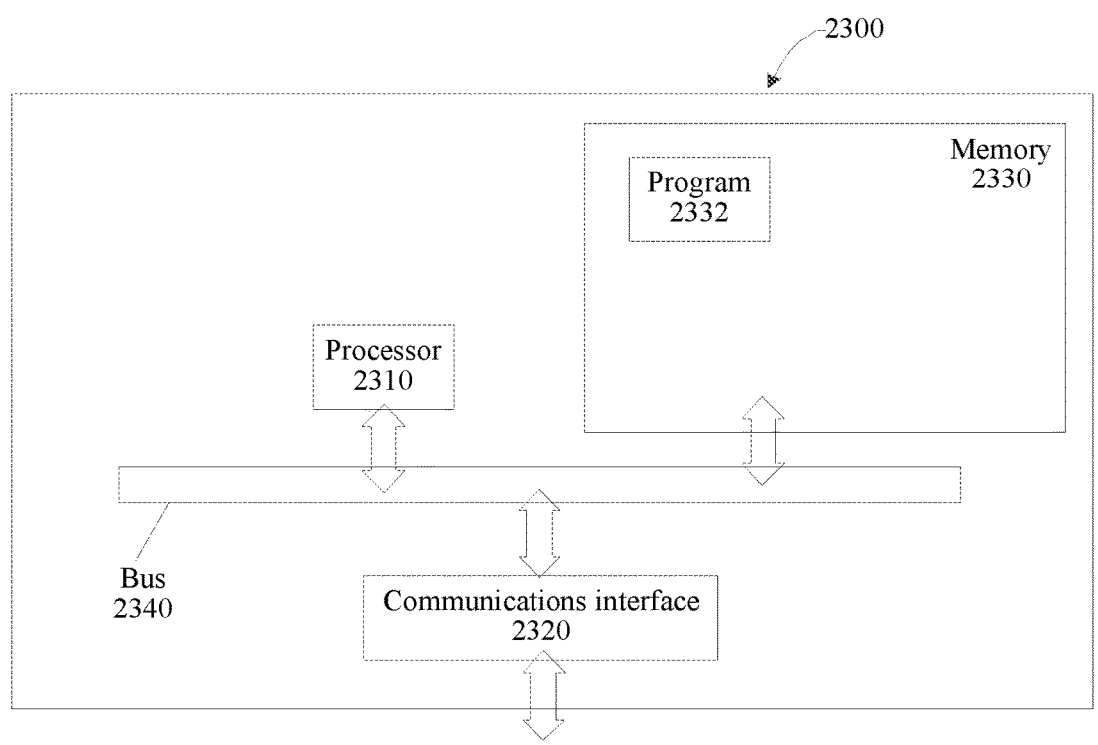
FIG. 23 is a schematic diagram of a hardware structure of the content sharing apparatus according to one example embodiment of the present application.

A hardware structure of the content sharing apparatus according to one embodiment of the present application is as shown in FIG. 23. The embodiment of the present application does not limit implementation of the content sharing apparatus; referring to FIG. 23, the apparatus 2300 may comprise:
  a processor 2310, a Communications Interface 2320, a memory 2330, and a communications bus 2340.

The processor 2310, the Communications Interface 2320, and the memory 2330 accomplish mutual communications via the communications bus 2340.

The Communications Interface 2320 is configured to communicate with other network elements.

The processor 2310 is configured to execute a program 2332, and specifically, can implement relevant steps in the method embodiment shown in FIG. 1.

Specifically, the program 2332 may comprise a program code, the program code comprising a computer operation instruction.

The processor 2310 may be a central processing unit (CPU), or an application specific integrated circuit (ASIC), or be configured to be one or more integrated circuits which implement the embodiments of the present application.

The memory 2330 is configured to store the program 2332. The memory 2330 may comprise a high-speed RAM memory, and may also comprise a non-volatile memory, for example, at least one magnetic disk memory. The program 2332 may specifically perform the following steps of:

> determining a projection region of a target region on a display region of a first display device relative to at least one eye of a user; and
>
> sending related information of the projection region to a second display device.

Reference can be made to the corresponding description in the corresponding steps or modules in the embodiments for implementation of the steps in the program 2332, which is not repeated herein. Those skilled in the art can clearly understand that, reference can be made to the corresponding process description in the method embodiments for the devices described above and the specific working procedures of the modules, and will not be repeated herein in order to make the description convenient and concise.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a controller, or a network device, and the like) to execute all or some steps of the method described in each embodiment of the present application. The foregoing storage medium comprises, a USB disk, a removable hard disk, a Read-Only Memory (ROM), a Random Access Memory (RAM), a magnetic disk, an optical disk or any other mediums that can store program codes.

The above example embodiments are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A method, comprising:
   determining, by a system comprising a processor, a projection region of a target region on a display region of a first display device relative to at least one eye of a user, wherein the target region is associated with a second display device, including cases where the target region is the display region of the second display device, or the target region is a region defined by borders of the second display device, and wherein the projection region is a region formed by points of intersection between connecting lines from the at least one eye to the target region and the display region of the first display device; and
   sending related information of the projection region to the second display device.

2. The method of claim 1, wherein the determining the projection region comprises:
   determining the projection region of the target region on the display region of the first display device relative to one eye of the user.

3. The method of claim 2, wherein the determining the projection region comprises:
   determining a position of the target region; and
   determining the projection region of the target region on the display region of the first display device relative to the one eye according to the position of the target region.

4. The method of claim 3, wherein the determining the projection region comprises:
   determining the projection region of the target region on the display region of the first display device relative to the one eye according to the position of the target region and the position of the one eye.

5. The method of claim 2, wherein the determining the projection region comprises:
   acquiring a fundus image of the one eye; and
   determining the projection region of the target region on the display region of the first display device relative to the one eye according to the fundus image.

6. The method of claim 1, wherein the determining the projection region comprises:
   determining the projection region of the target region on the display region of the first display device relative to two eyes of the user.

7. The method of claim 6, wherein the determining the projection region comprises:
   determining the position of the target region;
   determining a left eye projection region of the target region on the display region of the first display device relative to a left eye of the user and a right eye projection region of the target region on the display region of the first display device relative to a right eye of the user according to the position of the target region; and
   determining the projection region of the target region on the display region of the first display device relative to the two eyes according to the left eye projection region and the right eye projection region.

8. The method of claim 7, wherein the determining the left eye projection region and the right eye projection region comprises:
   determining the left eye projection region of the target region on the display region of the first display device relative to the left eye and the right eye projection region of the target region on the display region of the first display device relative to the right eye according to the position of the left eye, the position of the right eye and the position of the target region.

9. The method of claim 7, wherein the projection region comprises the left eye projection region and the right eye projection region.

10. The method of claim 6, wherein the determining the projection region comprises:
    acquiring a left fundus image of a left eye of the user, to determine a left eye projection region of the target region on the display region of the first display device relative to the left eye according to the left fundus image;
    acquiring a right fundus image of a right eye of the user, to determine a right eye projection region of the target region on the display region of the first display device relative to the right eye according to the right fundus image; and determining the projection region of the target region on the display region of the first display device relative to the two eyes according to the left eye projection region and the right eye projection region.

11. The method of claim 1, wherein the target region is a region corresponding to a gesture of the user.

12. The method of claim 1, further comprising:
displaying prompt information of the projection region on the display region of the first display device.

13. The method of claim 1, further comprising:
pre-establishing an association between the first display device and the second display device.

14. The method of claim 1, wherein the related information of the projection region comprises:
display content of the projection region.

15. The method of claim 1, wherein the related information of the projection region comprises:
display content of the projection region, and associated information of the display content.

16. The method of claim 1, wherein the related information of the projection region comprises:
coordinate information of display content of the projection region.

17. The method of claim 1, wherein a resolution of the second display device is higher than another resolution of the first display device.

18. An apparatus, comprising:
a memory that stores executable modules; and
a processor, coupled to the memory, that executes or facilitates execution of the executable modules, comprising:
a determination module configured to determine a projection region of a target region on a display region of a first display device relative to at least one eye of a user, wherein the target region is associated with a second display device, including at least one of a first case where the target region is the display region of the second display device, or a second case where the target region is a region defined by borders of the second display device, and wherein the projection region is a region formed by points of intersection between connecting lines from the at least one eye to the target region and the display region of the first display device; and
a sending module configured to send related information of the projection region to the second display device.

19. The apparatus of claim 18, wherein the determination module comprises:
a monocular determination sub-module configured to determine a projection region of the target region on the display region of the first display device relative to one eye of the user.

20. The apparatus of claim 19, wherein the monocular determination sub-module comprises:
a position determination unit configured to determine a position of the target region; and
a projection region determination unit, configured to determine the projection region of the target region on the display region of the first display device relative to the one eye according to the position of the target region.

21. The apparatus of claim 20, wherein the projection region determination unit is configured to determine the projection region of the target region on the display region of the first display device relative to the one eye according to the position of the target region and the position of the one eye.

22. The apparatus of claim 19, wherein the monocular determination sub-module comprises:
a fundus image acquisition unit configured to acquire a fundus image of the one eye; and
a projection region determination unit configured to determine the projection region of the target region on the display region of the first display device relative to the one eye according to the fundus image.

23. The apparatus of claim 18, wherein the determination module comprises:
a binocular determination sub-module configured to determine a projection region of the target region on the display region of the first display device relative to two eyes of the user.

24. The apparatus of claim 23, wherein the binocular determination sub-module comprises:
a first determination unit configured to determine the position of the target region;
a second determination unit configured to determine a left eye projection region of the target region on the display region of the first display device relative to a left eye of the user and a right eye projection region of the target region on the display region of the first display device relative to a right eye of the user according to the position of the target region; and
a third determination unit, configured to determine the projection region of the target region on the display region of the first display device relative to the two eyes according to the left eye projection region and the right eye projection region.

25. The apparatus of claim 24, wherein the second determination unit is configured to determine the left eye projection region of the target region on the display region of the first display device relative to the left eye and the right eye projection region of the target region on the display region of the first display device relative to the right eye according to the position of the left eye, the position of the right eye and the position of the target region.

26. The apparatus of claim 23, wherein the binocular determination sub-module comprises:
a first determination unit configured to acquire a left fundus image of a left eye of the user, to determine a left eye projection region of the target region on the display region of the first display device relative to the left eye according to the left fundus image;
a second determination unit, configured to acquire a right fundus image of a right eye of the user, to determine a right eye projection region of the target region on the display region of the first display device relative to the right eye according to the right fundus image; and
a third determination unit, configured to determine the projection region of the target region on the display region of the first display device relative to the two eyes according to the left eye projection region and the right eye projection region.

27. The apparatus of claim 18, wherein the executable modules further comprise:
a prompt module configured to display prompt information of the projection region on the display region of the first display device.

28. The apparatus of claim 18, wherein the executable modules further comprise:

an association module configured to pre-establish an association between the first display device and the second display device.

29. A computer readable storage apparatus, comprising at least one executable instruction, which, in response to execution, causes an apparatus comprising a processor to perform operations, comprising:
   determining a projection region of a target region on a display region of a first display device relative to an eye of a user identity determined to be interacting with the apparatus, wherein the target region is associated with a second display device, and wherein the target region is at least one of the display region of the second display device, or a region defined by borders of the second display device, and wherein the projection region is a region formed by points of intersection between connecting lines from the at least one eye to the target region and the display region of the first display device; and
   sending related information of the projection region to the second display device.

30. The computer readable storage apparatus of claim 29, wherein the determining the projection region comprises:
   determining the projection region of the target region on the display region of the first display device relative to one eye of the user.

31. An apparatus, comprising a processor and a memory, the memory storing executable instructions, the processor being connected to the memory via a communication bus, and when the apparatus operates, the processor executes the executable instructions stored in the memory, so that the apparatus executes operations, comprising:
   determining a projection region of a target region on a display region of a first display device relative to two eyes of a user identity, wherein the target region is associated with a second display device, including cases where the target region is the display region of the second display device, or the target region is a region defined by borders of the second display device, and wherein the projection region is a region formed by points of intersection between connecting lines from the at least one eye to the target region and the display region of the first display device; and
   sending related information of the projection region to the second display device.

32. The apparatus of claim 31, wherein the determining the projection region comprises:
   determining a position of the target region; and
   determining the projection region of the target region on the display region of the first display device relative to one eye according to the position of the target region.

33. The apparatus of claim 32, wherein the determining the projection region further comprises:
   determining the projection region of the target region on the display region of the first display device relative to the one eye according to the position of the target region and the position of the one eye.

* * * * *